United States Patent [19]
Steinwart et al.

[11] 3,847,257
[45] Nov. 12, 1974

[54] IGNITION SYSTEM FOR ROTARY PISTON COMBUSTION ENGINES OF TROCHOID TYPE

[76] Inventors: Johannes Steinwart, Schillerstrasse 8, Bad Friedrichshall II; Karl Feierabend, Ringstrasse 10, Bad Rappenau-Treschklingen, both of Germany

[22] Filed: Mar. 9, 1973

[21] Appl. No.: 339,963

[30] Foreign Application Priority Data
Mar. 10, 1972  Germany............................ 2211517
Nov. 18, 1972  Germany............................ 2256734

[52] U.S. Cl............ 192/.062, 192/.092, 123/117 R
[51] Int. Cl......................... F16d 67/06, F02p 5/04
[58] Field of Search................ 192/.062, .092, .04; 123/117 R, 146.5, 146.5 A, 117 A, 8.05

[56] References Cited
UNITED STATES PATENTS
| | | | |
|---|---|---|---|
| 1,861,417 | 5/1932 | Klaiber | 123/146.5 A |
| 3,129,795 | 4/1964 | Goeschel et al. | 192/.092 X |
| 3,525,317 | 8/1970 | Muir | 192/.062 UX |
| 3,584,608 | 6/1971 | Shibagaki | 123/117 R X |
| 3,593,696 | 7/1971 | Dietrich | 123/117 R |
| 3,626,455 | 12/1971 | Toda et al. | 123/146.5 A X |
| 3,703,887 | 11/1972 | Panhard | 123/117 R |
| 3,752,128 | 8/1973 | Tatsutomi et al. | 123/117 A X |

*Primary Examiner*—Samuel Scott
*Assistant Examiner*—Lance W. Chandler
*Attorney, Agent, or Firm*—Kane, Dalsimer, Kane, Sullivan & Kurucz

[57] ABSTRACT

The invention relates to an ignition system for a rotary piston combustion engine of trochoid type serving to propel a motor vehicle having a clutch and a shift gear, a throttle being arranged in the intake of the engine, and the ignition system having at least one spark plug, a high-voltage generator, for example an ignition coil, and a switch.

14 Claims, 6 Drawing Figures

IGNITION SYSTEM FOR ROTARY PISTON COMBUSTION ENGINES OF TROCHOID TYPE

DESCRIPTION OF PRIOR ART

In the use of such a rotary internal combustion engine to propel motor vehicles, the engine may fail to run quiet in forced mode, that is, throttle closed and engine speed faster than idling. The cause of this phenomenon is that the low idling intake does not suffice at overspeeds to maintain an ignitable mixture all the time. Not until a few revolutions after each spark will the repeated addition of small amounts of fresh intake and the spilling of an exhaust consisting of fresh gases and combustion products into the intake chamber improve the compressed mixture in quality to such a point that it becomes ignitable once more. Since the same thing is happening in all chambers successively, after a number of misses, combustion will occur in all chambers in succession. This alternation between firing and misfiring causes the periodic occurrence of a propelling and a braking torque. Thus three ignitions may be followed by several misses. A sequence of three ignitions and three misses at a time is especially disagreeable.

SUMMARY OF INVENTION

The object of the invention is to achieve a more uniform engine torque in forced mode. This problem, according to one proposal of the invention, is solved by providing two switch contacts in series, alternately actuated by a cam, one of which contacts may be short circuited by way of three switches in series, the first of which is closed when the throttle is closed, the second when the transmission is in gear, and the third when the clutch is let in. In forced mode, all three of these switches are closed all the time, so that only one of the two contacts functions, and hence necessarily each ignition is followed by a miss, even if an ignitable mixture per se is present. In any other operating mode, at least one of the three switches is open, so that both contacts are functioning and the normal uninterrupted ignition sequence is obtained.

According to another proposal of the invention, the problem stated may alternatively be solved by providing two switch contacts in parallel, alternately actuated by a negative cam, and arranging three switches in parallel with each other in the connecting line between one of the two contacts and the high-voltage generator, the first of which switches is open when the throttle is closed, the second when the transmission is in gear, and the third when the clutch is let in. Since all three switches are open in forced mode, the connection between the one contact and the high-voltage generator is broken, and hence only the other contact functions, so that an ignition will be followed by a miss. In all other modes, however, at least one of the three switches is closed, so that both contacts are functioning, yielding the normal uninterrupted ignition sequence.

According to still another proposal of the invention, the problem stated may be solved, alternatively again, by providing two switch contacts in parallel, alternately actuated by a negative cam, and arranging a switch in the connecting line between one of the contacts and the high-voltage generator, which switch is in communication with a differential pressure chamber acted upon firstly by the pressure in the intake line immediately ahead of the throttle and secondly by the pressure in the intake line immediately following the throttle, and opening the switch when the throttle is closed and the engine speed is faster than idling.

Alternatively, two switch contacts in series alternately actuated by a cam may be provided, and a short circuit line bridging the contacts may be arranged, having a switch associated with a differential pressure chamber acted upon firstly by the pressure in the intake line immediately ahead of the throttle and secondly by the pressure in the intake line immediately following the throttle, and closing the switch when the throttle is closed and the engine speed is faster than idling.

In the case of the two proposals last mentioned, in order to obtain a quick changeover to the normal uninterrupted ignition sequence when the throttle is opened, it is advantageous for the differential pressure chamber to have two diaphragms of unlike size, the larger being acted upon from the intake pipe above the throttle and the smaller from the intake pipe below. The quick changeover is further aided if the two lines leading to the differential pressure chamber issue from opposed points of the intake pipe, partly overlapped by the peripheral edge of the flap when the throttle is closed.

The foregoing proposals dependably prevent what has been called "forced" bucking when the throttle is closed. It has been found, however, that some drivers fail to release the gas pedal completely in forced mode, so that the throttle remains slightly opened. In that case, forced bucking may again occur, since the intake is only slightly greater than the idling intake, and hence insufficient at overspeed to maintain an ignitable mixture at all times. The same process may occur when driving at very low throttle, as in bumper-to-bumper traffic. To achieve a more uniform engine torque when the throttle is slightly opened as well, the switch actuated according to throttle position is to put one of the two contacts out of action even when the throttle is slightly open.

Thus if when decelerating the gas pedal is kept under some pressure, this switch will be actuated before the throttle is quite closed, and the desired suppression of every other ignition, to keep the vehicle from bucking, will be achieved. The same is true if the driver, in order to keep pace in a parade, actuates the gas pedal slightly. The power loss due to suppression of every other ignition is negligible in this operating range, and can be compensated if necessary by actuating the gas pedal more.

If the switch is actuated directly by the throttle setting mechanism, it is expedient to provide a switch with lag (for example a spring contact switch), acutated between about 3° and 8° throttle opening, since a switch with coinciding points of action and reaction will function in an unstable manner.

If the switch is actuated by a spring loaded pressure chamber according to the suction in the intake line, the suction line to the pressure chamber will issue from a point in the intake line where enough negative pressure prevails, even when the throttle is slightly opened, to actuate the switch.

DESCRIPTION OF THE DRAWINGS

Some embodiments of the invention will be described below by way of example, with reference to the drawings. In the drawings.

DESCRIPTION OF THE PREFERRED EMBODIMENTS

Figure 1:
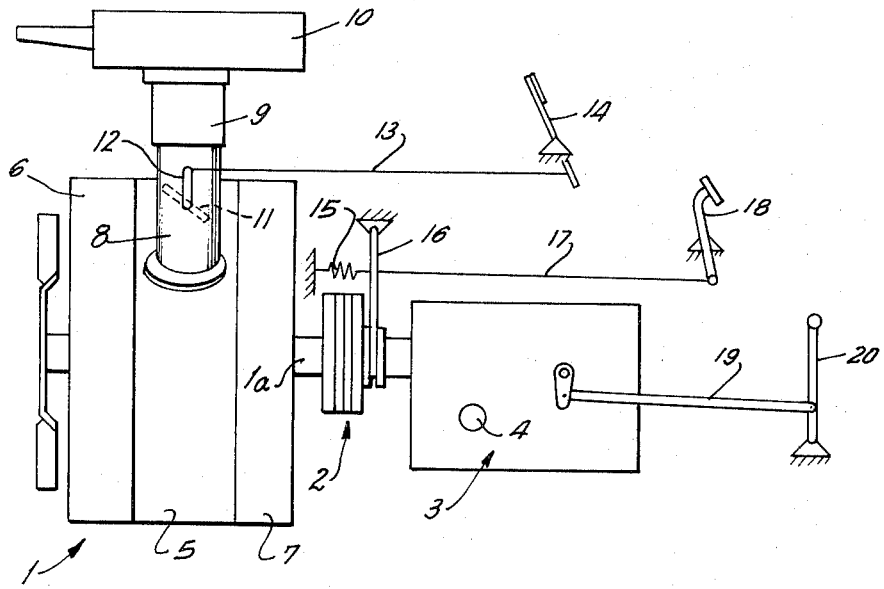
FIG. 1 shows a schematic representation of a motor vehicle powerplant consisting of a rotary internal combustion engine, a clutch and a shift gear, in which the ignition system according to the invention may be used.

Referring first to FIG. 1, this represents a rotary engine 1 driving a transmission 3 by way of clutch 2 with propeller shaft 4 connected to the driving wheels of the vehicle. The rotary piston combustion engine 1 of trochoid type, as embodied in this example, has a housing consisting of a shell 5 with biarcuate inner surface and end parts 6 and 7 in which a triangular piston is rotatably mounted on the eccentric of an eccentric shaft 1a. The speed ratio between the piston and the eccentric shaft is 1:3. In each of the three chambers, with corresponding phase displacement, a complete four-stroke cycle takes place during each full revolution of the piston, so that an ignition occurs during each revolution of the eccentric shaft 1a. To an inlet passage in the shell 5, an intake line 8 is connected, communicating with a carburetor 9 and an air filter 10 and fitted with a throttle 11 capable of being actuated from gas pedal 14 by way of linkage 12, 13. The clutch 2 is normally held in engaged position by a spring 15 and can be let out by way of a linkage 16, 17 by actuating a clutch pedal 18. The several speeds of the shift transmission 3 may be selected in the usual manner with a lever 20 by way of a connecting rod 19.

Figure 2:
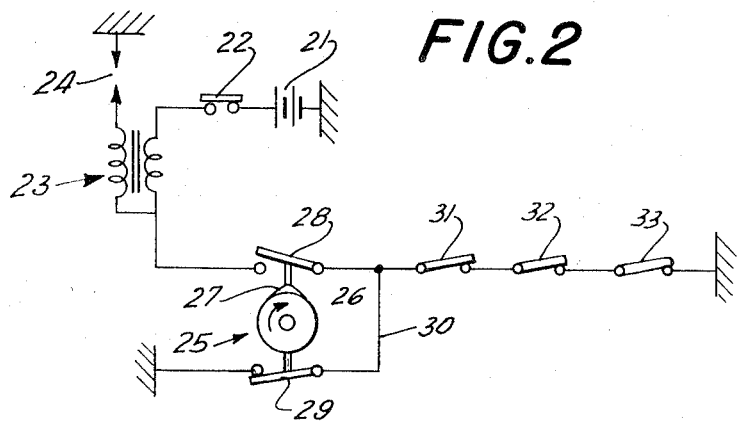
FIG. 2 shows one embodiment of an ignition system according to the invention, in schematic representation, for use in the rotary engine shown in FIG. 1.

An ignition system according to the invention for the rotary engine 1 shown in FIG. 1 is schematically represented in FIG. 2. The battery is designated 21, the ignition switch 22, the ignition coil 23 and the spark plug 24. The circuit of the primary winding of the ignition coil 23 is opened and closed by means of a switch generally designated 25, having a cam 26 rotating at half the speed of the eccentric shaft 1a of the rotary engine 1 and provided with a projection 27 alternately opening the one and the other of two contacts 28, 29. The contacts 28, 29 are in series. Thus one ignition is generated for each full revolution of the eccentric shaft.

In forced mode — that is, an operating condition in which the throttle 11 is closed but the engine 1 is being driven by the vehicle by way of transmission 3 and engaged clutch 2 at a speed faster than idling — however, contact 29 is short circuited to prevent the occurrence of three ignitions in succession followed by a larger or smaller number of misses. For this purpose, the connecting line 30 between the two contacts 28, 29 may be grounded by way of three switches 31, 32 and 33 in series. Switch 31 is so connected with the linkage 12, 13 or else with the gas pedal 14 actuating the throttle 11 that it is closed when the throttle 11 is closed. Switch 32 is connected with the clutch linkage 16, 17 or clutch pedal 18 and is closed when the clutch 2 is engaged. Switch 33, finally, is so connected with the shift linkage 19 or lever 20, or a member capable of being moved by the latter, that it is closed when the transmission 3 is shifted into any gear. Switch 33, therefore, is open only when the transmission 3 is in neutral.

In FIG. 2, the three switches 31, 32 and 33 are represented in their closed position, short circuiting contact 29, so that only contact 28 functions, and an ignition occurs only at every other revolution of the eccentric shaft 1a of the rotary engine 1. Only in forced mode are all three switches 31, 32 and 33 closed, since only then is the throttle 11 closed, the clutch 2 let in, and the transmission 3 in gear. In normal operation, the throttle 11 is more or less open, opening switch 31, so that both contacts 28 and 29 will function. In idling, to be sure, throttle 11 and hence switch 31 are closed, but then either the clutch 2 is out and switch 32 therefore open, or else the transmission 3 is in neutral, opening switch 33. Even when idling, therefore, both contacts 28, 29 function, and the normal uninterrupted ignition sequence is obtained.

Figure 3:
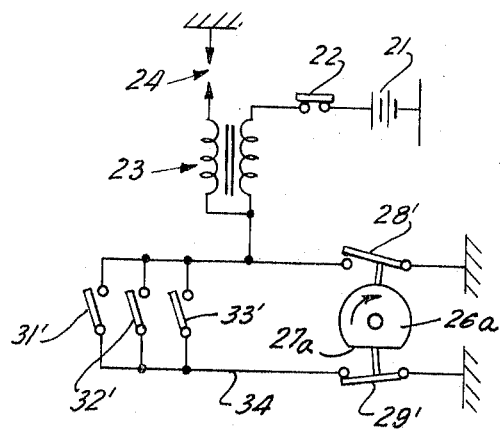
FIG. 3 shows a second embodiment of an ignition system according to the invention.

FIG. 3 shows a modification of the embodiment according to FIG. 2, in which the contacts 28', 29' are in parallel and so actuated alternately by a cam 26a having a negative point 27a that during closure of one contact, the other contact is open. In the connecting line 34 from contact 29' to the primary winding of the ignition coil 23, three switches 31', 32' and 33' are arranged in parallel, of which switch 31' is so connected with the gas linkage 12, 13 or pedal 14 of FIG. 1 that it is open when the throttle 11 is closed. Switch 32' is so connected with the clutch linkage 16, 17 or pedal 18 that it is open when the clutch 2 is in. Switch 33', finally, is so connected with the shift linkage 19 or lever 20 that it is open when the transmission 3 is in any gear. When transmission 3 is in neutral, in other words, switch 33 is closed.

In forced mode, throttle 11 is closed, clutch 2 is in, and transmission 3 is in gear. Thus, all three switches 31', 32' and 33' are open, and so the connecting line 34 between contact 29' and ignition coil 23 is interrupted. Hence only contact 28' functions, so that an ignition occurs only during every other revolution of the eccentric shaft 1a of rotary engine 1. In normal operation, as well as in idling, at least one of the switches 31', 32' and 33' is closed, so that both contacts 28', 29' function and bring about an uninterrupted ignition sequence.

Figure 4:
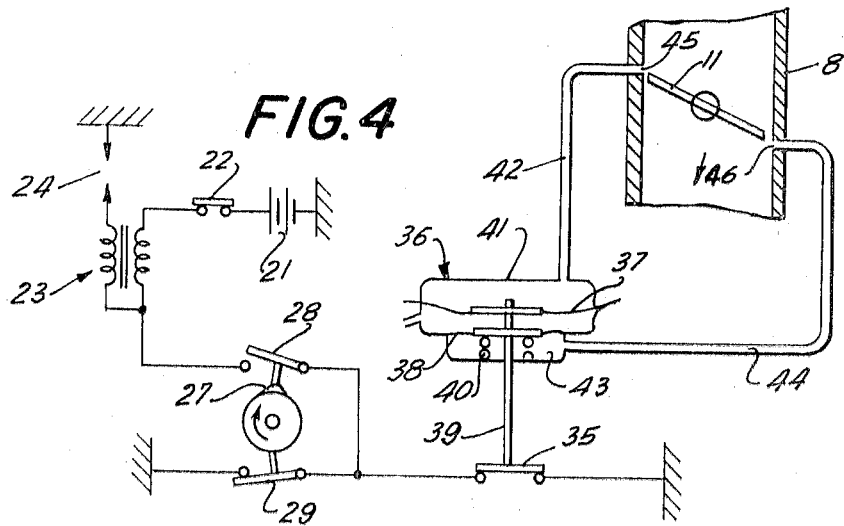
FIG. 4 shows a third embodiment of an ignition system according to the invention.

FIG. 4 shows another possible way to defeat every other ignition in forced mode. For this purpose, as in the embodiment of FIG. 2, two contacts 28 and 29 are connected in series, to be opened alternately by switch cam 27. The short circuiting of contact 29 in forced mode is in this case accomplished by a switch 35. Switch 35 is actuated by a differential pressure chamber 36 containing a larger diaphragm 37 and a smaller diaphragm 38. The diaphragms 37 and 38 are connected with each other and with switch 35 by a linkage 39. A spring 40 tends to hold switch 35 in open position. The space 41 bounded by the larger diaphragm 37 is connected by a line 42 to the intake line 8 above throttle 11, and the space 43 bounded by the smaller diaphragm 38 is connected by a line 44 to the intake line 8 below throttle 11. In forced mode, a high negative pressure develops in the intake line 8 below throttle 11, acts by way of line 44 on the smaller diaphragm 38, and displaces it downward in the drawing against the action of the spring 40, closing switch 35. This short circuits contact 29, and only contact 28 functions, with the result that an ignition occurs only during every other revolution of the eccentric shaft 1a. When idling, it is true, throttle 11 is likewise closed, but in that condition the suction in intake line 8 below throttle 11 does not suffice to displace diaphragm 38 against the action of spring 40, the engine speed being less when idling than in forced mode. If the throttle 11 is swung out of its closed position, then the negative pressure in intake line 8 will act by way of line 42 in space 41 as well, and the linkage 39 will be displaced upward with the cooperation of spring 40, opening switch 35 and securing the normal uninterrupted ignition sequence. To obtain a very prompt response to a swing of throttle 11 out of its closed position, diaphragm 37 is made larger than diaphragm 38. The same purpose is served by the arrangement of the orifices 45 and 46 of lines 42 and 44, which, as may be seen, are partly overlapped by the peripheral edge of throttle 11 when closed. Preferably, when throttle 11 is closed only about one-third of orifices 45, 46 is clear.

Figure 5:
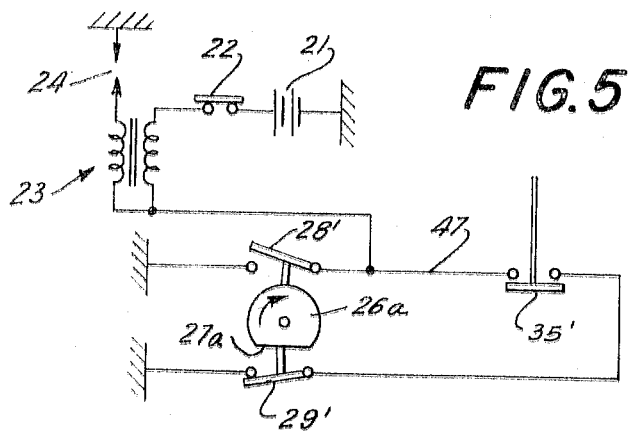
FIG. 5 shows a modification of the ignition system shown in FIG. 4.

FIG. 5 shows a modification of the embodiment according to FIG. 4, in which the two contacts 28', 29', as in the embodiment of FIG. 3, are in parallel and actuated alternately by a cam 26a having a negative point 27a, and the connecting line 47 between contact 29 and ignition coil 23 has a switch 35' opened in forced mode by the differential pressure chamber 36 shown in FIG. 4. Thus, line 47 is interrupted, and only contact 28' functions.

The ignition systems shown are intended for a simple rotary engine of trochoid type, having only one spark plug 24. If there are several spark plugs, they will be in parallel with spark plug 24. The invention is applicable to multiple rotary engines as well. In a double rotary engine, the ignition systems represented are changed only to the extent that instead of one cam point 27, two are provided at an angular interval of 90°, and in association with the secondary winding of ignition coil 23, a distributor is provided, rotating at half the speed of the eccentric shaft and alternately connecting the secondary winding of the ignition coil 23 to the spark plug or plugs of the one and the other unit of the engine.

Figure 6:
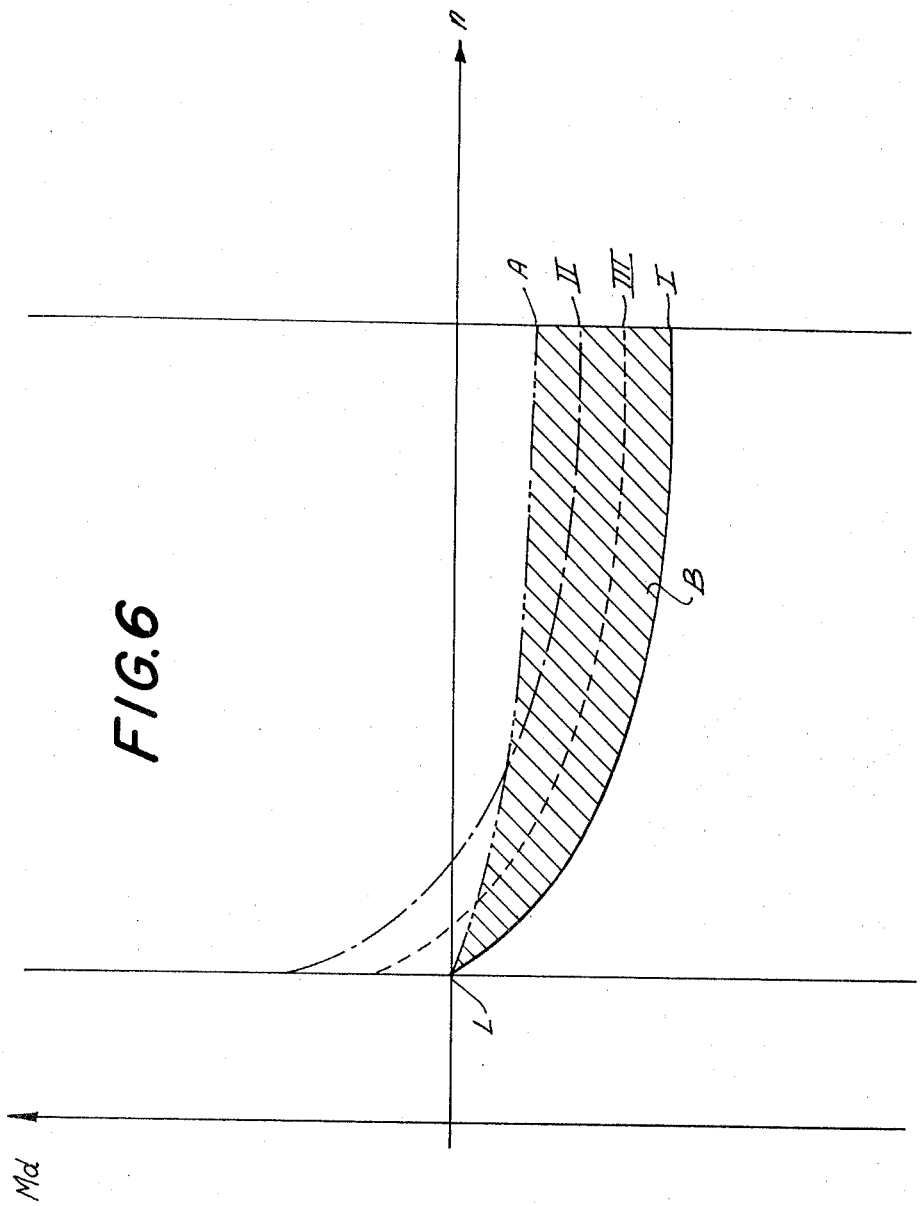
FIG. 6 shows a graph of engine torque as a function of speed at various throttle settings.

FIG. 6 represents a graph of the engine torque as a function of speed at various throttle settings. L designates the idling point. The solid line I shows the torque curve with throttle closed. A designates the misfiring limit, above which an ignitable mixture is present at all times and dependable ignition is assured. The shaded area B between lines I and A is the "bucking zone" in which fluctuations of acceleration occur because there is not always an ignitable mixture in every chamber, so that several ignitions are followed by several misses.

If the suppression of every other ignition takes place only when the throttle is closed, bucking may nevertheless occur in the area B above line I. To avoid this, it is expedient to suppress every other ignition when the throttle is slightly open as well.

In the diagram, the torque for a throttle opening of 6° is represented by the dot-dash line II. This line II passes partly below the misfiring limit A, but its distance from said misfiring limit A is so small that fluctuations in acceleration will be below the limit of sensibility. In an actual engine, a throttle opening of 6° corresponds to about 8 percent of maximum throttle.

In the use of a jump contact switch actuated directly by the throttle setting mechanism, the point of action may, for example, lie at 6° throttle opening and the point of reaction, for example, at 3.5° throttle opening. The torque curve for 3.5° throttle opening is represented in the diagram by the dotted line III. When decelerating the vehicle, then, every other ignition will be suppressed only when a throttle opening of 3.5° is reached, since empirically the throttle will not remain farther open even if the driver rests his foot lightly on the gas pedal. At low acceleration, on the other hand, such as frequently occurs in bumper-to-bumper traffic, the suppression of every other ignition will be maintained up to a throttle opening of 6°. The hysteresis (lag) of 2.5° throttle angle ensures stable functioning.

The misfiring limit curve shown is only by way of example, depending as it does on a multitude of factors, for example kind of ignition system, degree of overlap between inlet and outlet valve opening, number of spark plugs, etc.

What is claimed:

1. An ignition system for a rotary piston internal combustion engine of trochoid type to propel a motor vehicle having a transmission, clutch and a shift gear, and an intake line incorporating a throttle, the ignition system being electrically coupled to at least one spark plug, a high-voltage generator and an interruptor comprising a cam and two contacts arranged in series and being alternately actuated by the cam, three switches connected in series of which the first is closed when the throttle is closed, the second is closed when the transmission is in gear, and the third is closed when the clutch is engaged, means for coupling said first, second and third switch to said throttle, transmission and clutch, respectively, whereby one of said contacts is short circuited when all three switches are closed.

2. An ignition system for a rotary piston internal combustion engine of trochoid type to propel a motor vehicle having a transmission, clutch and a shift gear, and an intake like incorporating a throttle, the ignition system being electrically coupled to at least one spark plug, a high-voltage generator and an interruptor comprising a negative cam and two contacts arranged in parallel and being alternately actuated by the cam, three switches arranged in parallel, of which the first is open when the throttle is closed, the second is open when the transmission is in gear, and the third is open when the clutch is engaged, means for coupling said first, second and third switch to said throttle, transmission and clutch, respectively, a line between one of said contacts and the high-voltage generator, said switches being arranged in the line between one of said contacts and the high-voltage generator.

3. An ignition system for a rotary piston internal combustion engine of trochoidal type to propel a motor vehicle having a transmission, clutch and a shift gear and an intake line incorporating a throttle, the ignition system being electrically coupled to at least one spark plug, a highvoltage generator and an interruptor comprising a negative cam and two contacts arranged in parallel, a line interconnecting one of said contacts and said high-voltage generator, and a switch in the interconnecting line, a pressure differential element, said switch being connected to the differential pressure element acted upon firstly by the pressure in the intake line immediately upstream of the throttle, secondly by the pressure in the intake line immediately downstream of the throttle and opening said switch when the throttle is closed and the engine speed is faster than idling.

4. An ignition system for a rotary piston internal combustion engine of trochoidal type to propel a motor vehicle having a transmission, clutch and a shift gear, and an intake line incorporating a throttle, the ignition system being electrically coupled to at least one spark plug, a high-voltage generator and an interruptor comprising a cam and two contacts arranged in series, a line short-circuiting one of said contacts, and a switch arranged in said short circuit line, a pressure differential element, said switch being connected with a differential pressure element acted upon firstly by the pressure in the intake line immediately upstream of the throttle, secondly by the pressure in the intake line immediately downstream of the throttle and closing the switch when the throttle is closed and the engine speed is faster than idling.

5. The ignition system according to claim 3, wherein the differential pressure element has two diaphragms of unlike size, the larger of which is acted upon from the intake line upstream of the throttle and the smaller from the intake line downstream of the throttle.

6. The ignition system according to claim 4, wherein the differential pressure element has two diaphragms of unlike size, the larger of which is acted upon from the intake line upstream of the throttle and the smaller from the intake line downstream of the throttle.

7. The ignition system according to claim 5, wherein the two lines leading to the differential pressure element issue from opposed points in the intake line which points are partly overlapped by the peripheral edge of the throttle when closed.

8. The ignition system according to claim 6, wherein the two lines leading to the differential pressure element issue from opposed points in the intake line which points are partly overlapped by the peripheral edge of the throttle when closed.

9. The ignition system according to claim 1, wherein the throttle switch is actuated when the throttle is open.

10. The ignition system according to claim 2, wherein the throttle switch is actuated when the throttle is open.

11. The ignition system according to claim 9, wherein the throttle switch has a lag and is actuated by the setting mechanism of the throttle between substantially 3° and 8° throttle opening.

12. The ignition system according to claim 10, wherein the throttle switch has a lag and is actuated by the setting mechanism of the throttle between substantially 3° and 8° throttle opening.

13. The ignition system according to claim 5, wherein the line connecting the differential pressure element with the intake line downstream of the throttle issues from a point in the intake line where sufficient negative pressure for actuating the switch is present when the throttle is open.

14. The ignition system according to claim 6, wherein the line connecting the differential pressure element with the intake line downstream of the throttle issues from a point in the intake line where sufficient negative pressure for actuating the switch is present when the throttle is open.

* * * * *

UNITED STATES PATENT OFFICE
CERTIFICATE OF CORRECTION

Patent No. 3,847,257            Dated November 12, 1974

Inventor(s)    Johannes Steinwart and Karl Feierabend

It is certified that error appears in the above-identified patent and that said Letters Patent are hereby corrected as shown below:

Insert the name of assignee -- Audi NSU Auto Union

Aktiengesellschaft and Wankel Gmbh of West Germany--.

Signed and sealed this 6th day of May 1975.

(SEAL)
Attest:

RUTH C. MASON
Attesting Officer

C. MARSHALL DANN
Commissioner of Patents
and Trademarks